United States Patent
Ryu et al.

(10) Patent No.: US 11,824,408 B2
(45) Date of Patent: Nov. 21, 2023

(54) DUAL ROTOR-TYPE MOTOR FOR REDUCING TORQUE RIPPLE AND COMPRESSOR COMPRISING SAME

(71) Applicant: LG Electronics Inc., Seoul (KR)

(72) Inventors: Dongseok Ryu, Seoul (KR); Kiman Kim, Seoul (KR); Sangjoon Eum, Seoul (KR)

(73) Assignee: LG Electronics Inc., Seoul (KR)

( * ) Notice: Subject to any disclaimer, the term of this patent is extended or adjusted under 35 U.S.C. 154(b) by 763 days.

(21) Appl. No.: 16/966,814

(22) PCT Filed: Jan. 30, 2019

(86) PCT No.: PCT/KR2019/001316
§ 371 (c)(1),
(2) Date: Jul. 31, 2020

(87) PCT Pub. No.: WO2019/151783
PCT Pub. Date: Aug. 8, 2019

(65) Prior Publication Data
US 2021/0044186 A1    Feb. 11, 2021

(30) Foreign Application Priority Data
Feb. 1, 2018 (KR) .................. 10-2018-0013124

(51) Int. Cl.
*H02K 16/02* (2006.01)
*F25B 1/02* (2006.01)
(Continued)

(52) U.S. Cl.
CPC ............... *H02K 16/02* (2013.01); *F25B 1/02* (2013.01); *H02K 1/278* (2013.01); *H02K 1/2791* (2022.01); *H02K 29/03* (2013.01)

(58) Field of Classification Search
CPC ...... H02K 16/02; H02K 1/278; H02K 1/2791; H02K 1/28; H02K 1/274; H02K 29/03;
(Continued)

(56) References Cited

U.S. PATENT DOCUMENTS 7,557,486 B2 *  7/2009  Choi .................. H02K 7/14
                                            310/266
8,207,648 B2 *  6/2012  Li ...................... H02K 16/02
                                            310/216.069
(Continued)

FOREIGN PATENT DOCUMENTS

JP    2003299281    10/2003
JP    2003299327    10/2003
(Continued)

*Primary Examiner* — Emmanuel E Duke
(74) *Attorney, Agent, or Firm* — Fish & Richardson P.C.

(57) ABSTRACT

A dual rotor-type motor according to an embodiment of the present invention comprises: a stator around which a coil is wound; an outer rotor; and an inner rotor, wherein the inner rotor and the outer rotor have different initial angles, and thus the inner rotor and the outer rotor are misaligned from each other corresponding to the difference between the initial angles thereof. Therefore, the present invention can reduce torque ripple by a relatively simple method, and thus can improve efficiency of a motor and reduce vibration and noise.

20 Claims, 8 Drawing Sheets

(51) Int. Cl.
*H02K 29/03* (2006.01)
*H02K 1/2791* (2022.01)
*H02K 1/278* (2022.01)

(58) Field of Classification Search
CPC ....... H02K 2213/03; F25B 1/02; F04B 35/04; F04B 39/00; F04B 39/0027
See application file for complete search history.

(56) References Cited

U.S. PATENT DOCUMENTS

| | | | | |
|---|---|---|---|---|
| 2004/0232800 | A1* | 11/2004 | Seguchi | H02K 16/02 |
| | | | | 310/266 |
| 2004/0239199 | A1* | 12/2004 | Qu | H02K 21/16 |
| | | | | 310/266 |
| 2009/0134735 | A1* | 5/2009 | Yoshikawa | H02K 16/02 |
| | | | | 310/198 |
| 2013/0243626 | A1 | 9/2013 | Kim | |

FOREIGN PATENT DOCUMENTS

| | | | | |
|---|---|---|---|---|
| JP | 2012217283 | | 11/2012 | |
| JP | 2018011426 | | 1/2018 | |
| KR | 20060086661 A | * | 8/2006 | ............... H02K 1/27 |
| KR | 20090004451 A | * | 1/2009 | ............. H02K 16/02 |
| KR | 20100085057 | | 7/2010 | |
| KR | 20120076172 | | 7/2012 | |
| KR | 20130044754 | | 5/2013 | |
| KR | 20130092887 | | 8/2013 | |
| KR | 101382599 | | 4/2014 | |

\* cited by examiner

[PRIOR ART]

[PRIOR ART]

[PRIOR ART]

DUAL ROTOR-TYPE MOTOR FOR REDUCING TORQUE RIPPLE AND COMPRESSOR COMPRISING SAME

CROSS-REFERENCE TO RELATED APPLICATIONS

This application is a National Stage application under 35 U.S.C. § 371 of International Application No. PCT/KR2019/001316, filed on Jan. 30, 2019, which claims the benefit of Korean Patent Application No. 10-2018-0013124, filed on Feb. 1, 2018. The disclosures of the prior applications are incorporated by reference in their entirety.

TECHNICAL FIELD

The present invention relates to a dual rotor-type motor for reducing a torque ripple and a compressor including the same.

BACKGROUND ART

In the case of a refrigerator, most noise generated by the product is generated by a compressor for circulating a refrigerant, and most compressor noise is generated by a motor. Accordingly, it is concluded that the noise of the motor should be reduced in order to reduce the noise of the product.

Vibration and noise of motors are generated due to cogging torque, torque ripples, and electromagnetic oscillation sources. Among them, the cogging torque and the torque ripple are generated due to a change in magnetic flux of a stator when a rotor rotates and may be improved through a core design.

In the conventional interior permanent magnet (IPM) motor, a torque ripple is reduced through a method of skewing a stator, multi-layer permanent magnets of a rotor, or the like to improve vibration and noise. However, the conventional method has various disadvantages from viewpoints of manufacturing and machining of the motor.

FIG. 1 is a schematic view illustrating a conventional dual rotor-type motor, and FIG. 2 is a plan view illustrating the dual rotor-type motor.

As illustrated in the drawing, a conventional dual rotor-type motor 10 includes an outer rotor 11, an inner rotor 13, and a stator 15.

The outer rotor 11 on which a plurality of permanent magnets 11a and 11b are disposed at an inner side thereof in a circumferential direction and the inner rotor 13 on which a plurality of permanent magnets 13a are disposed at an outer side thereof in the circumferential direction rotate on outer and inner sides of the stator 15.

Accordingly, currents flow through coils 17 wound around the stator 15 positioned between the outer rotor 11 and the inner rotor 13 to generate torque.

In addition, in the case of the dual rotor-type motor 10, a value of a total torque is calculated by summing the torque generated by the outer rotor 11 and the inner rotor 13.

Meanwhile, even in the case of the dual rotor-type motor 10, efforts for reducing vibration and noise of the motor are being made.

In Korean Patent Publication No. 10-2013-0092887 (Publication Date: Aug. 21, 2013, hereinafter, referred to as Related Art 1), a permanent magnet motor is disclosed as a related art related to the present invention. In the case of the permanent magnet motor disclosed in Related Art 1, a torque ripple may be minimized by adjusting heights of tooth extensions, distances between the tooth extensions which are adjacent to each other, electrical angles of the tooth extensions, and angles of linear portions of tooth extension portions of stator teeth. However, since teeth of Related Art 1 should be improved with a complicated structure, it is difficult to machine.

In addition, in Korean Patent Publication No. 10-2010-0085057 (Publication Date: Jul. 28, 2010, hereinafter, referred to as 'Related Art 2'), a dual rotor motor is disclosed as another related art related to the present invention. The disclosed dual rotor motor of Related Art 2 suppresses a cogging torque to realize a low noise effect by improving a tooth structure of a stator core such that an angle of an inner slot is greater than that of an inner slot. However, there are problems in that, it is practically difficult to machine teeth to have a shape according to Related Art 2, and a cost is increased due to the machining.

In addition, in Korean Patent Publication No. 10-2013-0044754, a permanent magnet motor is disclosed as still another related art related to the present invention. In Related Art 3, the permanent magnet motor allows assemblability between teeth and a rotor to be improved, deformation and a failure rate of the rotor to be reduced, and a cogging torque to be reduced by minimizing leakage flux. However, in Related Art 3, a tooth extension portion is formed on a side end of an outer circumference of the tooth in a circumferential direction, a cut groove is formed from the outer circumference of the tooth toward a center of a shaft of a rotor, and an intrusion groove into which an molding object is inserted is formed in an inner circumference of the tooth in a radial direction. In order to provide the complicated structure of the tooth, there are problems in that a long time is required for machining and a machining cost is increased.

Accordingly, a technical solution is required to simply improve a structure so as to reduce vibration and noise of a dual rotor-type motor without requiring a complicated machining process in which, for example, a structure is improved or a skew and a stack structure are applied.

DISCLOSURE

Technical Problem

The present invention is directed to providing a dual rotor-type motor allowing a torque ripple to be reduced by providing an initial angle difference between an inner rotor and an outer rotor so that rotational misalignment occurs.

The present invention is also directed to providing a compressor to which a motor using a structure, in which initial angles of an inner rotor and an outer rotor are different when a shaft is coupled to the inner rotor and the outer rotor to reduce a torque ripple only by simply assembling them, is applied to allow vibration and noise to be reduced.

Objectives of the present invention are not limited to the above described objectives, and other objectives and advantages of the present invention may be understood by the following descriptions and clearly understood by embodiments of the present invention. In addition, it may be seen that the objectives and the advantages of the present invention may be achieved using elements and combinations thereof described in the appended claims.

Technical Solution

One aspect of the present invention provides a dual rotor-type motor allowing a torque ripple to be reduced by providing an initial angle difference between an inner rotor and an outer rotor using a simple method so that rotational misalignment occurs without structurally improving teeth, adjusting a complicated skew, applying a multiple stack structure, and the like.

A dual rotor-type motor according to one embodiment of the present invention includes a stator around which a coil is wound, an outer rotor which is installed to face an outer wheel of the stator and on which a plurality of permanent magnets are disposed on an inner circumferential surface facing the outer wheel of the stator in a circumferential direction, and an inner rotor which is installed to face an inner wheel of the stator and on which a plurality of permanent magnets are disposed on an outer circumferential surface facing the inner wheel of the stator in the circumferential direction, wherein initial angles of the inner rotor and the outer rotor are different so that the inner rotor and the outer rotor are misaligned with each other to correspond to the difference between the initial angles. Accordingly, by providing an initial angle difference of about 5° between the inner rotor and the outer rotor, the dual rotor-type motor may rotate such that a torque profile of the inner rotor and a torque profile of the outer rotor are mutually reduced so as to reduce a torque ripple.

Another aspect of the present invention provides a compressor including a dual rotor-type motor having a structure in which an initial angle difference is provided between an inner rotor and an outer rotor even only using a process in which a shaft is sequentially coupled and assembled to centers of the outer rotor and the inner rotor.

A compressor according to another embodiment of the present invention includes a dual rotor-type motor including a stator around which a coil is wound, an outer rotor which is installed to face an outer wheel of the stator and on which a plurality of permanent magnets are disposed on an inner circumferential surface facing the outer wheel of the stator in a circumferential direction, and an inner rotor which is installed to face an inner wheel of the stator and on which a plurality of permanent magnets are disposed on an outer circumferential surface facing the inner wheel of the stator in the circumferential direction, wherein initial angles of the inner rotor and the outer rotor are different so that the inner rotor and the outer rotor are misaligned with each other to correspond to the difference between the initial angles, a shaft which passes through rotation centers of the outer rotor and the inner rotor to be coupled to the outer rotor and the inner rotor and rotates with the outer rotor and the inner rotor, a connecting rod which is connected through a coupling pin of an upper portion of the shaft and linearly moves a piston using rotation of the shaft, a cylinder which stores a refrigerant and compresses the refrigerant using the piston, and a cylinder block which supports the shaft and through which the cylinder is provided. In such a compressor, since a torque ripple of the dual rotor-type motor may be reduced only by simply assembling the shaft, the outer rotor, and the inner rotor, vibration and noise of the compressor may be reduced.

Advantageous Effects

According to the present invention, torque profiles generated by an inner rotor and an outer rotor when a dual rotor-type motor rotates are mutually reduced so that a torque ripple can be reduced and vibration and noise of the motor can be reduced.

Particularly, in a case in which an initial angle difference between the inner rotor and the outer rotor is about 5° (for example, 4.5° to 5.5°), when the inner rotor and the outer rotor rotate, since rotational misalignment can occur therebetween, a torque ripple can be reduced by a maximum of 2%.

In addition, according to the present invention, a coupling protrusion is formed on a shaft, and first and second insertion grooves are formed in the outer rotor and the inner rotor. In this case, an angle difference between the first and second insertion grooves is about 5° (for example, 4.5° to 5.5°) so that a structure allowing a torque ripple to be reduced through only assembly work without performing a specific work can be implemented.

Specific effects and the above-described effects of the present invention will be described while specific embodiments for realizing the present invention are described.

MODES OF THE INVENTION

Figure 1:
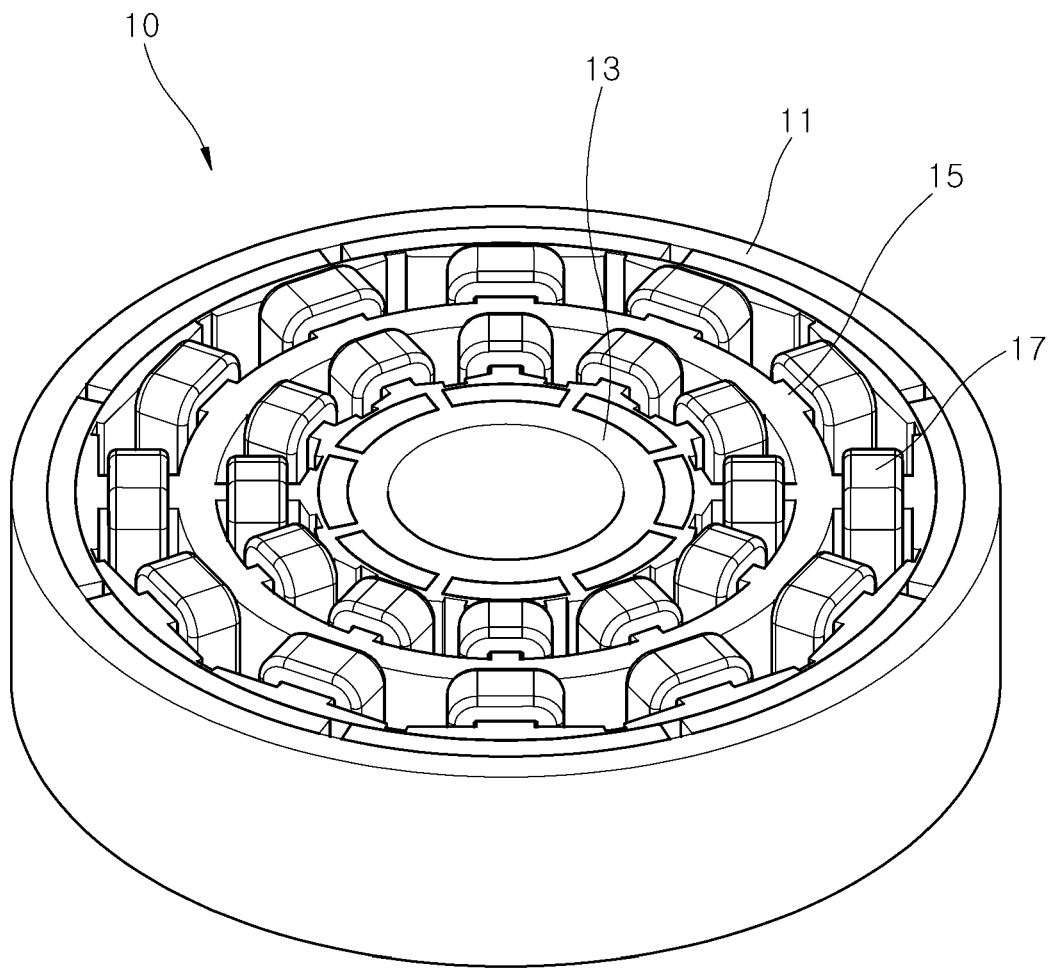
FIG. 1 is a schematic view illustrating a conventional dual rotor-type motor.
Figure 2:
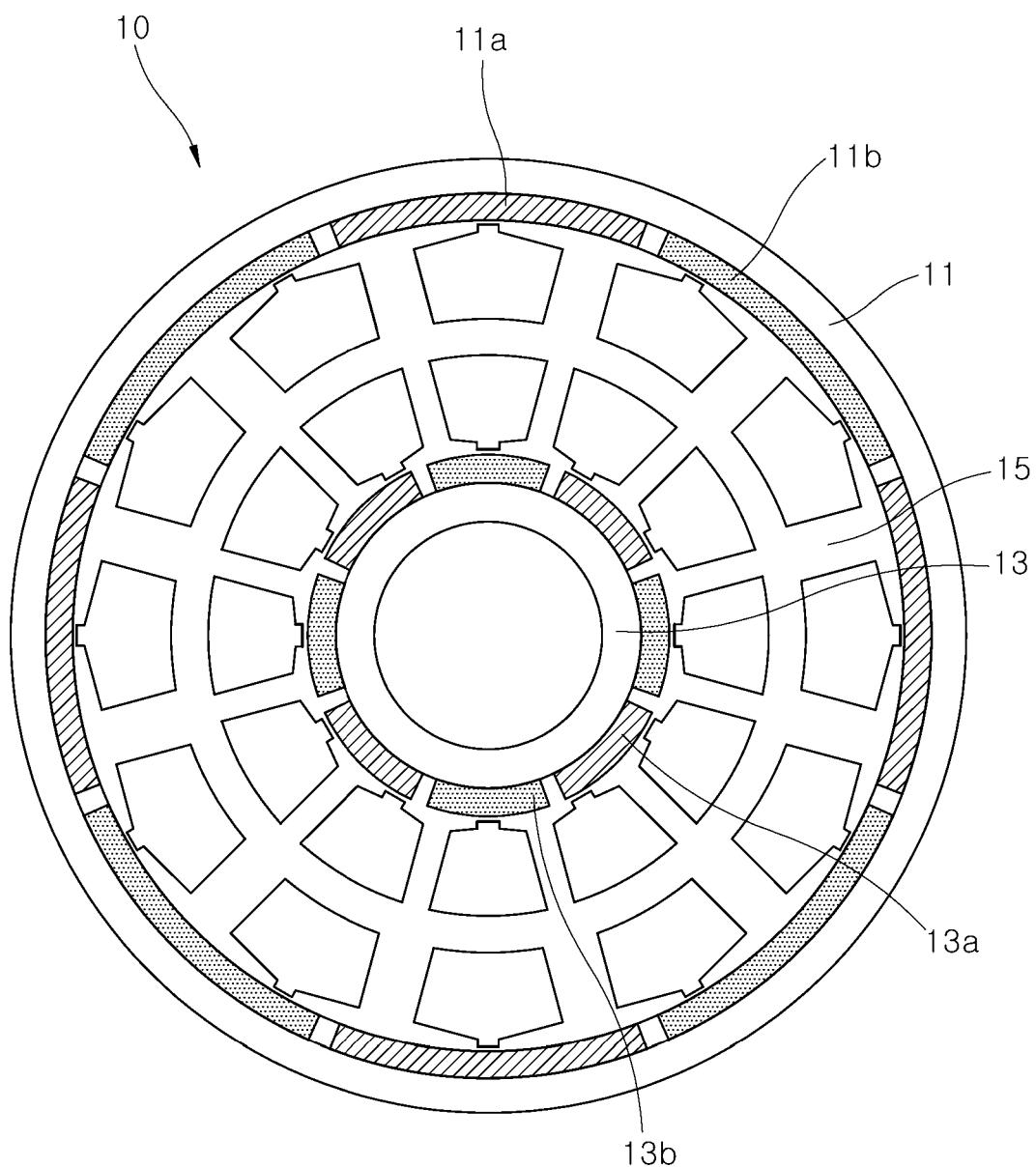
FIG. 2 is a plan view illustrating the conventional dual rotor-type motor.

Hereinafter, embodiments of the present invention will be described in detail with reference to the accompanying drawings in order for those skilled in the art to easily perform the present invention. The present invention may be implemented in several different forms and is not limited to the embodiments described herein.

Parts irrelevant to the description will be omitted in order to clearly describe the present invention, and the same or similar parts are denoted by the same reference numerals throughout this specification. In addition, some embodiments of the present invention will be described in detail with reference to exemplary drawings. When the reference numerals are assigned to elements of each drawing and the same elements are illustrated in different drawings, the same reference numerals may be assigned to the same elements if possible. Also, in the descriptions of the present invention, when detailed descriptions of related known configurations or functions are deemed to unnecessarily obscure the gist of the present invention, they will be omitted.

In descriptions of components of the present invention, it should be understood that, when an element is referred to as being "connected or coupled" to another element, the element may be directly connected or coupled to another element, still another element may be interposed therebetween, or the elements may be connected or coupled by still another element.

A dual rotor-type motor refers to a motor having a structure including an outer rotor and an inner rotor, that is, a plurality of rotors.

Figure 9:
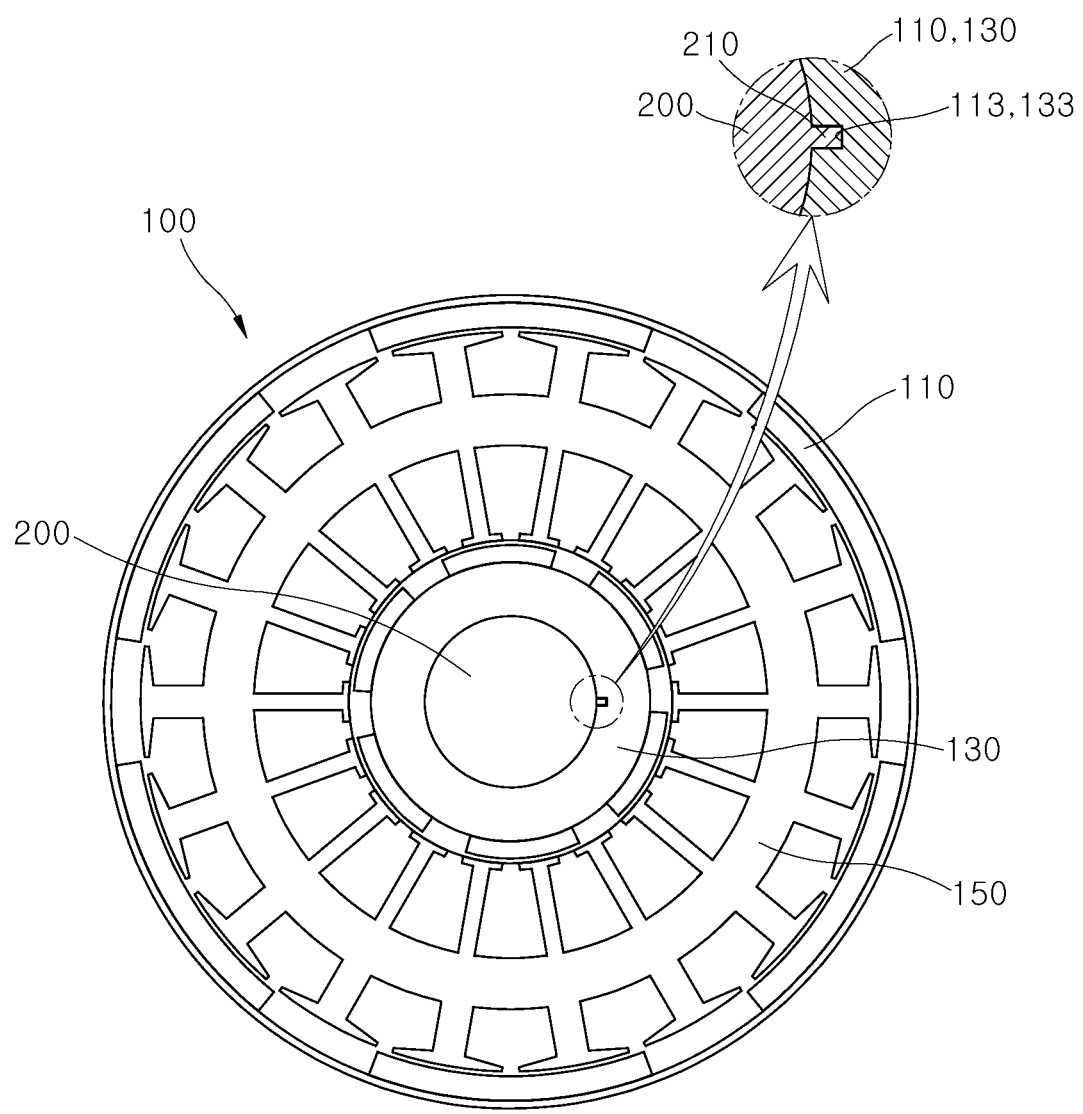
FIG. 9 is a plan view illustrating the dual rotor-type motor coupled using the coupling structure illustrated in FIG. 8.

FIG. 9 is a plan view illustrating a dual rotor-type motor, and an illustrated dual rotor-type motor 100 therein includes an outer rotor 110, an inner rotor 130, and a stator 150.

Coils are wound around the stator 150. The coils may be wound therearound to have a form as in a drawing numeral 17 of FIG. 1 but are not necessarily limited to the illustrated form.

The outer rotor 110 is installed to face an outer wheel of the stator 150.

Specifically, the outer rotor 110 may have a structure in which a plurality of permanent magnets are disposed on an inner circumferential surface (or inner side surface) facing the outer wheel of the stator 150 in a circumferential direction.

For example, the permanent magnets having N- and S-poles may be alternately disposed on the inner circumferential surface of the outer rotor 110 in the circumferential direction.

The inner rotor 130 is installed to face an inner wheel of the stator 150.

Specifically, the inner rotor 130 may have a structure in which a plurality of permanent magnets are disposed on an outer circumferential surface (or outer side surface) facing the inner wheel of the stator 150 in the circumferential direction.

For example, the permanent magnets having N- and S-poles may be alternately disposed on the outer circumferential surface of the inner rotor 130 in the circumferential direction.

The outer rotor 110 is formed to rotate at an outer side of the stator 150, and the inner rotor 130 is formed to rotate at an inner side of the stator 150.

Since the outer rotor 110 and the inner rotor 130 are formed to rotate at the outer and inner sides of the stator 150 as described above, currents flow through the coils wound around the stator 150 to generate torque.

Figure 3:
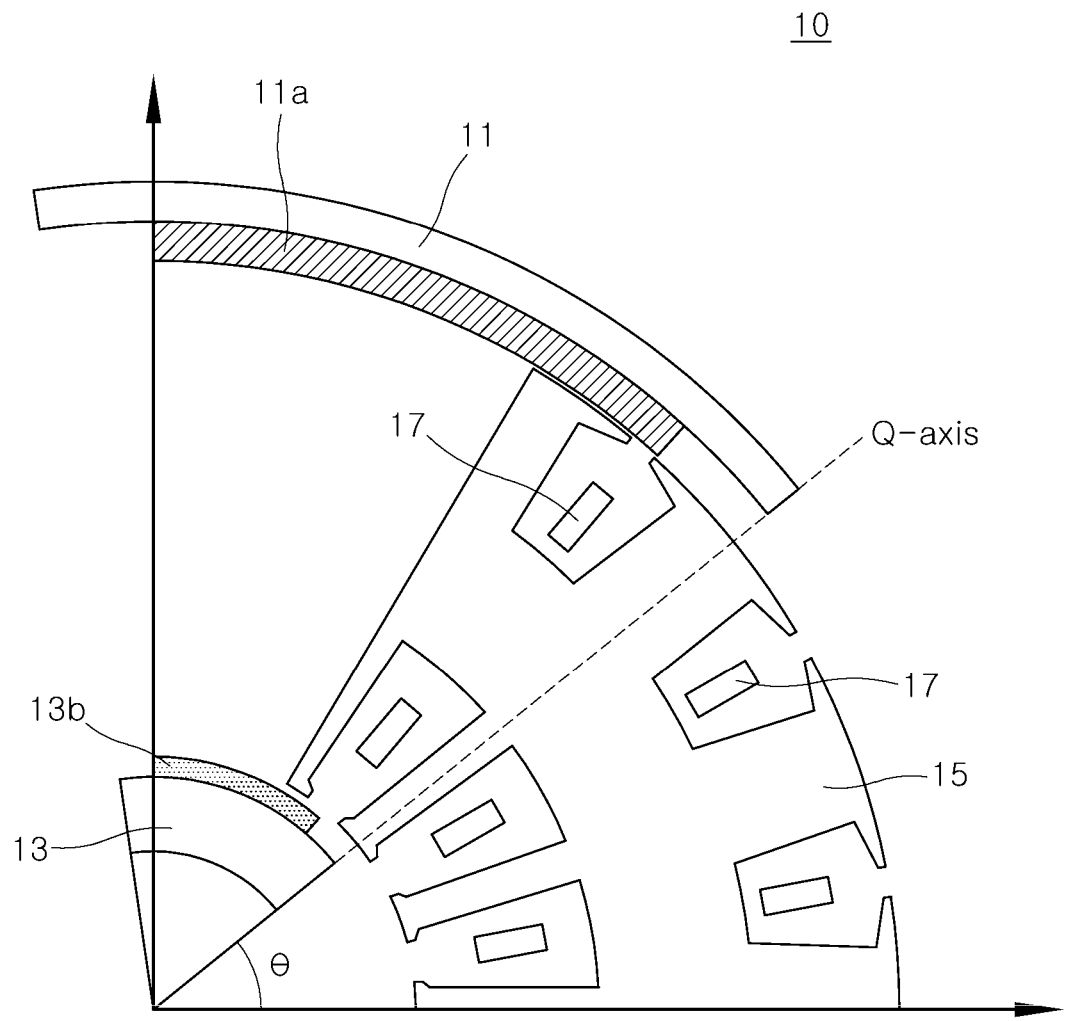
FIG. 3 is a view illustrating an arrangement structure of an outer rotor and an inner rotor of the conventional dual rotor-type motor.
Figure 4:
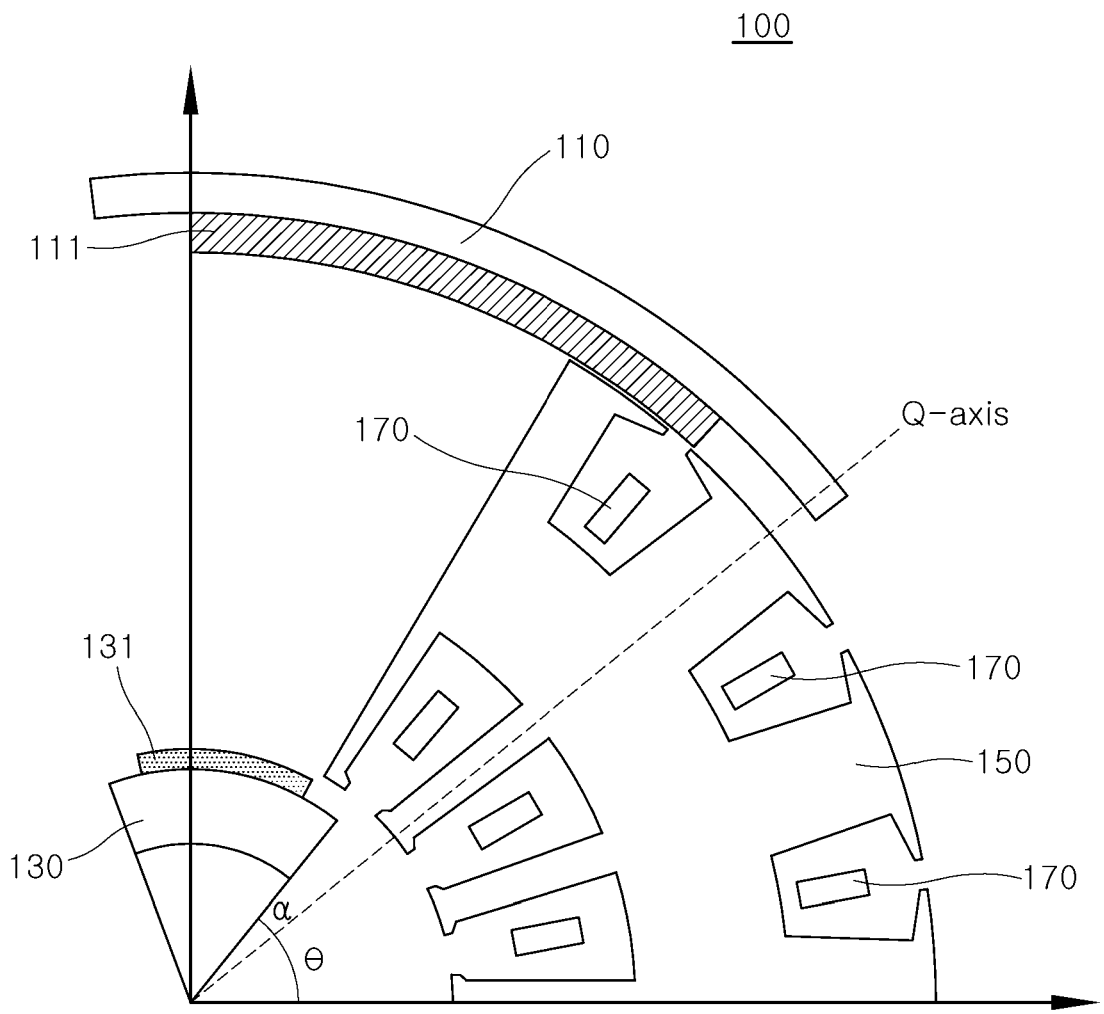
FIG. 4 is a view illustrating a state in which initial angles of an outer rotor and an inner rotor are different in a dual rotor-type motor according to one embodiment of the present invention.

FIG. 3 is a view illustrating an arrangement of an outer rotor and an inner rotor of the conventional dual rotor-type motor, and FIG. 4 is a view illustrating a state in which initial angles of the outer rotor and the inner rotor are different in the dual rotor-type motor according to one embodiment of the present invention.

In FIG. 3, a conventional general dual rotor-type motor 10 is shown.

In the dual rotor-type motor 10 illustrated in FIG. 3, an outer rotor 11 in which permanent magnets 11*a* are provided on an inner side surface and an inner rotor 13 in which permanent magnets 13*b* are provided on an outer side surface are disposed opposite to each other with respect to a reference axis Q-axis which is rotated by an angle θ (for example, 40°).

In the case of the dual rotor-type motor 10, torque is calculated by summing torque generated by the inner rotor 13 and torque generated by the outer rotor 11, and when rotational alignment occurs between the inner rotor 13 and the outer rotor 11, vibration and noise may be increased.

Referring to FIG. 4, in the illustrated dual rotor-type motor 100 according to one embodiment of the present invention, the outer rotor 110 in which permanent magnets 111 are provided on the inner side surface and the inner rotor 130 in which permanent magnets 131 are provided on the outer side surface are disposed opposite to each other with respect to a reference axis Q-axis rotated by an angle θ (for example, 40°). However, in this case, the inner rotor 130 has an initial angle which is greater than an initial angle of the outer rotor 110 by an angle α.

Accordingly, the inner rotor 130 and the outer rotor 110 may be formed to rotate in a misaligned state corresponding to an initial angle difference of the angle α.

The stator 150 is disposed between the inner rotor 130 and the outer rotor 110 which are formed as described above, a shape and a structure of the stator 150 may be the same or similar to those of a conventional stator, and the structure of the stator 150 is not particularly changed therefrom.

Coils 170 are wound around the stator 150 at the inner side of the stator 150, and when the inner rotor 130 and the outer rotor 110 rotate, currents flow through the coils 170 wound around the stator 150 to generate torque. In this case, the torque refers to the sum of torque generated by the inner rotor 130 and torque generated by the outer rotor 110.

Accordingly, in one embodiment of the present invention, the inner rotor 130 and the outer rotor 110 are intentionally misaligned by the angle α so that the torques of the inner rotor 130 and the outer rotor 110 are mutually reduced. Accordingly, a torque ripple can be reduced so that vibration and noise can be reduced as a result.

Figure 5:
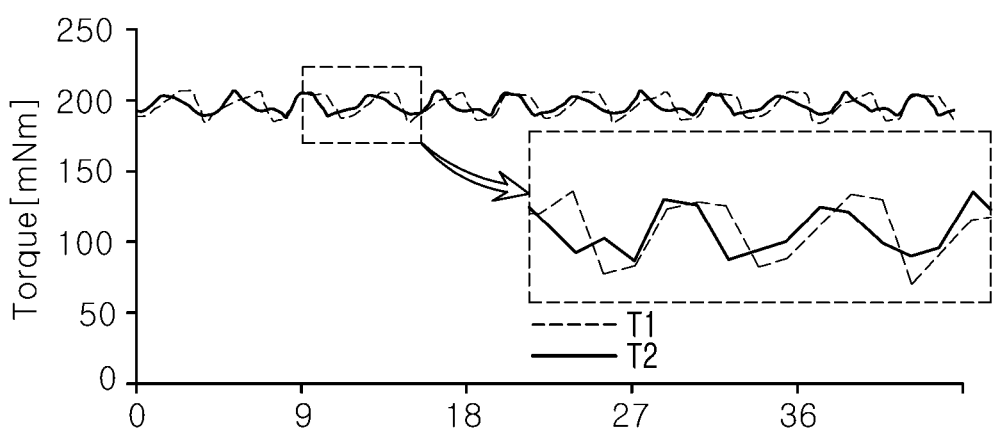
FIG. 5 is a graph showing torque waveforms of a conventional comparative example (T1) illustrated in FIG. 3, and one working example (T2) of the present invention illustrated in FIG. 4.

FIG. 5 is a comparison graph of a torque waveform of the conventional dual rotor-type motor 10 (see FIG. 3) in which an initial angle is not applied to the inner rotor, and a torque waveform of the dual rotor-type motor 100 (see FIG. 4) in which an initial angle is applied to the inner rotor according to one embodiment of the present invention.

Referring to FIG. 5, the torque waveform T1 of the conventional dual rotor-type motor 10 (see FIG. 3) is shown with a dotted line, and the torque waveform T2 of the dual rotor-type motor 100 (see FIG. 4) according to one embodiment of the present invention is shown with a solid line.

In this case, the torque waveform T2 is a waveform having an initial angle which is greater than an initial angle of the outer rotor by 5°, and it can be seen that a torque ripple is significantly reduced when compared to the conventional comparative example in which the initial angle is not applied to the inner rotor.

Further referring to FIG. 4, in the dual rotor-type motor 100 according to one embodiment of the present invention, the initial angle of the inner rotor 130 may further have an initial angle of 4.5° to 5.5°, that is, the angle α, with respect to the reference axis Q-axis on which the outer rotor 110 is arranged.

For example, when the angle θ of the reference axis Q-axis, on which the outer rotor 110 is arranged, is 40°, the inner rotor 130 may further rotate from the reference axis Q-axis within a range of 4.5° to 5.5° to have an angle of 44.5° to 45.5° (that is, θ+α).

In this case, the number of the permanent magnets 111 disposed on the inner circumferential surface of the outer rotor 110 may be equal to the number of the permanent magnets 131 disposed on the outer circumferential surface of the inner rotor 130, and each of the permanent magnets 111 may be disposed opposite to one of the permanent magnets 131.

However, due to the initial angle difference between the inner rotor 130 and the outer rotor 110, the permanent magnets 111 and 131 which are disposed opposite to each other may be disposed to be misaligned with each other by the angle α about rotation centers of the outer rotor 110 and the inner rotor 130.

Figure 6:
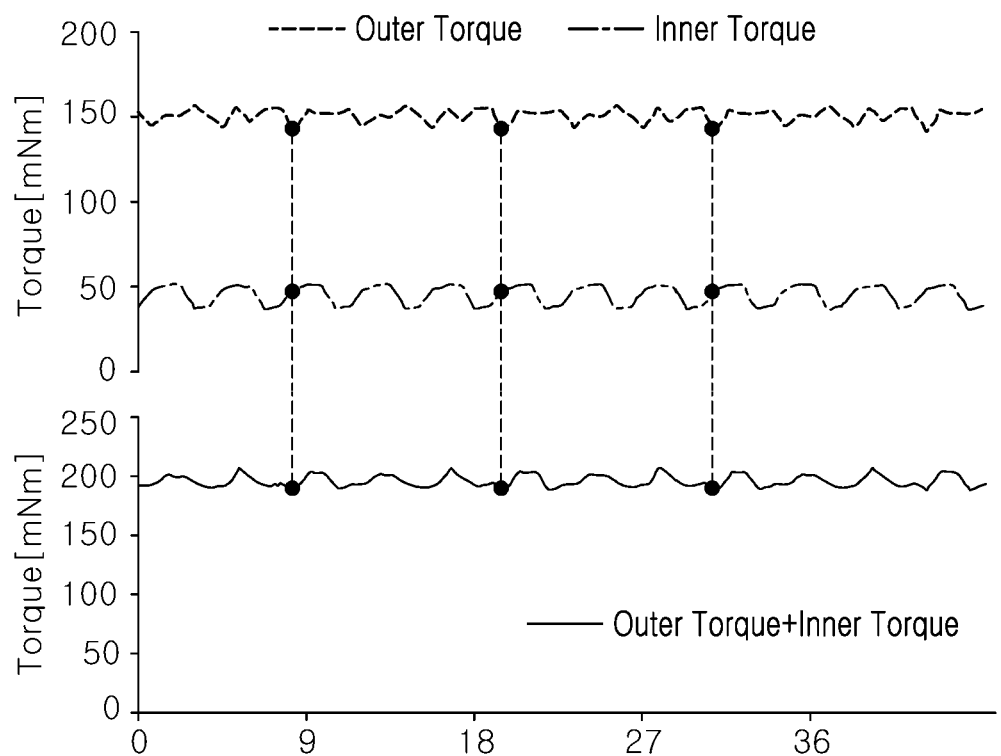
FIG. 6 is a graph showing a waveform of torque of the outer rotor, a waveform of torque of the inner rotor, and a waveform of torque in which the torque of the outer rotor and the torque of the inner rotor are combined in the dual rotor-type motor according to one embodiment of the present invention.

FIG. 6 is a graph showing a waveform of torque of the outer rotor, a waveform of torque of the inner rotor, and a waveform of torque in which the torque of the outer rotor and the torque of the inner rotor are combined in the dual rotor-type motor according to one embodiment of the present invention.

Referring to FIG. 6, an illustrated dotted line refers to an outer torque of the outer rotor 110 (see FIG. 4), a dashed dotted line refers to an inner torque of the inner rotor 130 (see FIG. 4), and a solid line refers to the sum (outer torque+inner torque) of the outer and inner torques. Torque profiles of FIG. 6 are a result derived from the dual rotor-type motor according to one embodiment of the present invention which is manufactured with 6 poles and 18 slots through a toroidal winding method.

As illustrated in FIG. 6, in a case in which there is the initial angle difference of about 4.5° to 5.5° between the inner rotor 130 (see FIG. 4) and the outer rotor 110 (see FIG. 4) and the inner rotor 130 and the outer rotor 110 rotate in a misaligned state, a torque ripple can be reduced by a maximum of 2%.

Figure 7:
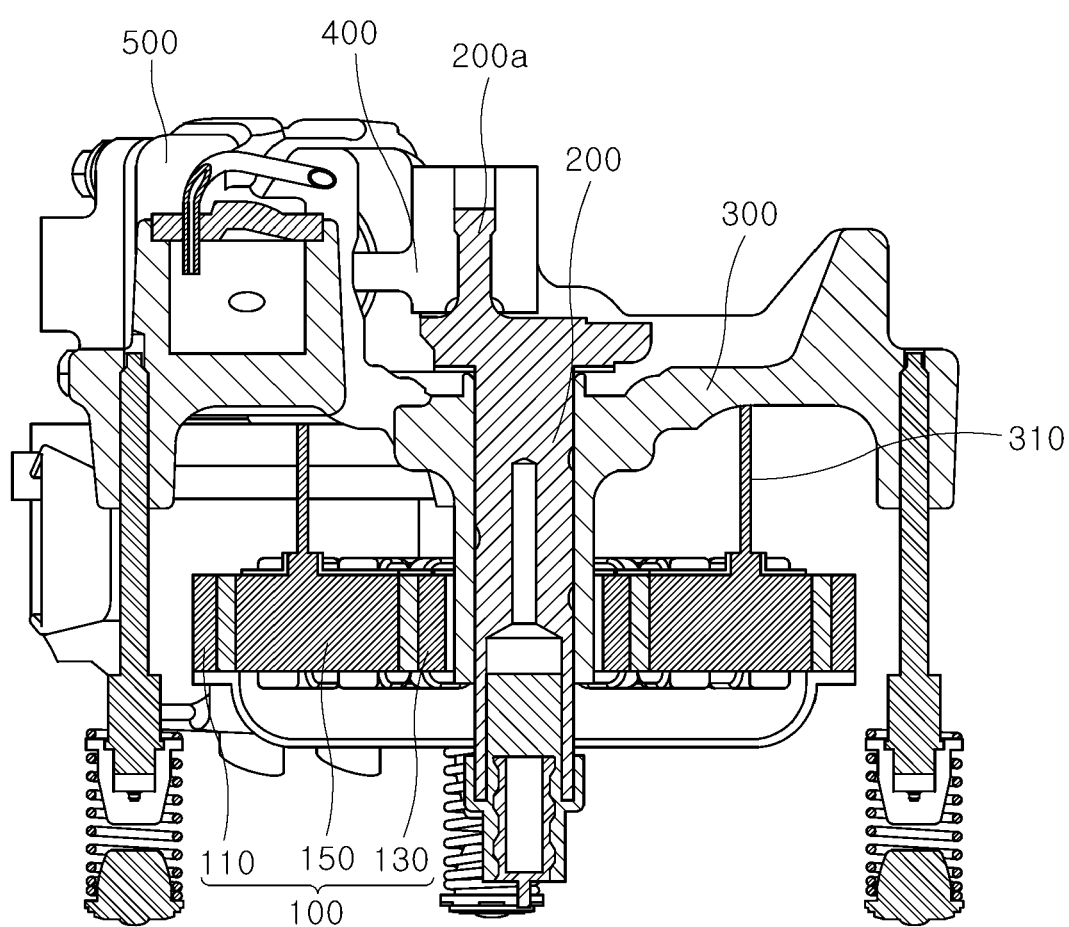
FIG. 7 is a schematic view illustrating a compressor including a dual rotor-type motor according to another embodiment of the present invention.

FIG. 7 is a schematic view illustrating a compressor including a dual rotor-type motor according to another embodiment of the present invention.

Referring to FIG. 7, according to the present invention, a compressor 1000 including a dual rotor-type motor may be provided. The illustrated compressor 1000 includes a dual rotor-type motor 100, a shaft 200, a connecting rod 400, a cylinder 500, and a cylinder block 300.

The dual rotor-type motor 100 includes a stator 150 around which coils are wound, an outer rotor 110, and an inner rotor 130.

In this case, the outer rotor 110 may be installed to face an outer wheel of the stator 150 and may have a structure in which a plurality of permanent magnets disposed on an inner circumferential surface face the outer wheel of the stator 150 in a circumferential direction.

The inner rotor 130 may be installed to face an inner wheel of the stator 150 and may have a structure in which a plurality of permanent magnets are disposed on an outer circumferential surface facing the inner wheel of the stator 150 in the circumferential direction.

In this case, an initial angle of the inner rotor 130 and an initial angle of the outer rotor 110 are different by an angle (for example, 4.5° to 5.5°), and the inner rotor 130 and the outer rotor 110 may rotate in a misaligned state corresponding to an initial angle difference therebetween. According to such a structure, a torque profile of the inner rotor 130 and a torque profile of the outer rotor 110 may be mutually reduced so as to reduce a torque ripple causing vibration and noise.

The shaft 200 may pass through rotation centers of the outer rotor 110 and the inner rotor 130 to be coupled to the outer rotor 110 and the inner rotor 130. Accordingly, the shaft 200 may be rotated with the outer rotor 110 and the inner rotor 130 in the compressor 1000.

The cylinder block 300 serves to support the shaft 200 to rotate at an inner center of the compressor 1000 and serves as a body having one upper side through which the cylinder 500 compressing a refrigerant is provided.

The connecting rod 400 is connected to a coupling pin 200a protruding from an upper portion of the shaft 200 to linearly move a piston in the cylinder 500 using a rotation force of the shaft 200.

The cylinder 500 may store the refrigerant and compress the refrigerant stored therein using movement of the piston.

Figure 8:
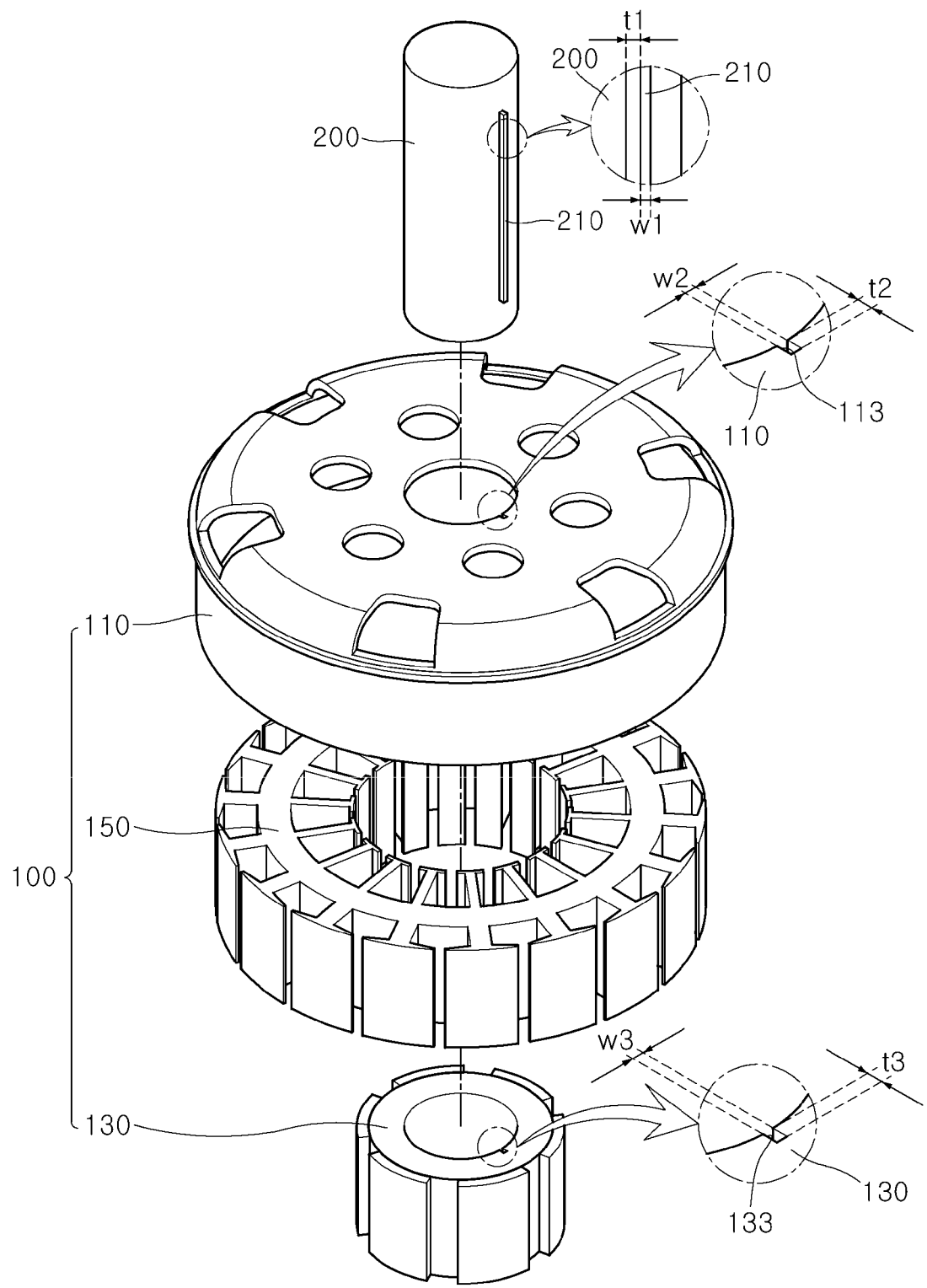
FIG. 8 is an exploded view illustrating a coupling structure between a shaft, an outer rotor, and an inner rotor forming the compressor including the dual rotor-type motor according to another embodiment of the present invention.

FIG. 8 is an exploded view illustrating a coupling structure between the shaft, the outer rotor, and the inner rotor forming the compressor including the dual rotor-type motor according to another embodiment of the present invention.

Referring to FIG. 8, an exploded view of the shaft 200 and the dual rotor-type motor 100 in which the shaft 200 passes through a rotation center thereof to be coupled thereto may be seen.

The inner rotor 130 is inserted into and coupled to the dual rotor-type motor 100 from under the stator 150 to face the inner wheel of the stator 150, and the outer rotor 110 is inserted into and coupled to the dual rotor-type motor 100 from above the stator 150 to face the outer wheel of the stator 150.

In addition, the shaft 200 vertically passes through the rotation center of the dual rotor-type motor 100 to be coupled to the dual rotor-type motor 100.

A specific coupling order will be described. First, the shaft 200 passes through a center of the outer rotor 110 to be inserted into the outer rotor 110 positioned at an upper portion thereof and passes through a center of the inner rotor 130 to be inserted into the inner rotor 130 positioned at a lower portion thereof.

In this case, a coupling protrusion 210 having a linear shape in a vertical and longitudinal direction protrudes from an outer circumferential surface of the shaft 200.

In addition, a first insertion groove 113 into which the coupling protrusion 210 is inserted is formed at the center of the outer rotor 110, and a second insertion groove 133 into which the coupling protrusion 210 is inserted is formed at the center of the inner rotor 130.

The first insertion groove 113 and the second insertion groove 133 have sizes corresponding to a size and a shape of a protruding cross section of the coupling protrusion 210. For example, when the coupling protrusion 210 protrudes to have a square cross section as illustrated in FIG. 8, the first and second insertion grooves 113 and 133 may be formed to have groove depths t2 and t3 and groove widths w2 and w3 corresponding to a protrusion length t1 and a protrusion width w1 of the coupling protrusion.

In addition, the first and second insertion grooves 113 and 133 may be formed at positions at which the outer rotor 110 and the inner rotor 130 are misaligned to correspond to the initial angle difference between the outer rotor 110 and the inner rotor 130.

Accordingly, even only by sequentially assembling the shaft 200 into the outer rotor 110 and the inner rotor 130, the coupling protrusion 210 sequentially passes through the first and second insertion grooves 113 and 133 to be coupled to the first and second insertion grooves 113 and 133. Accordingly, there is the initial angle difference of about 5° between the outer rotor 110 and the inner rotor 130 according to a relationship of preset positions of the first and second insertion grooves 113 and 133, and when the outer rotor 110 and the inner rotor 130 rotate, misalignment occurs therebetween.

FIG. 9 is a plan view illustrating the coupling structure between the shaft, the outer rotor, and the inner rotor forming the compressor including the dual rotor-type motor according to another embodiment of the present invention.

Referring to FIG. 9, the shaft 200 passes through the rotation center of the dual rotor-type motor 100 to be coupled to the dual rotor-type motor 100. In this case, the coupling protrusion 210 protruding from the outer circumferential surface of the shaft 200 is insertion-coupled to the first insertion groove 113 of the outer rotor 110, and then the coupling protrusion 210 is insertion-coupled to the second insertion groove 133 of the inner rotor 130.

The inner rotor 130 may have the initial angle which is greater than the initial angle of the outer rotor 110 by about 5° only by simply assembling them due to a preset position difference between the first and second insertion grooves 113 and 133. Accordingly, the dual rotor-type motor having the structure allowing a torque ripple to be reduced can be provided, and the torque ripple can be reduced only by simply assembling them without performing a complicated machining and improving a structure.

As described above, according to the structure and functions of the present invention, when the dual rotor-type motor rotates, a torque profile generated by the inner rotor and a torque profile generated by the outer rotor are mutually reduced so as to reduce the torque ripple so that vibration and noise of the motor can be reduced. Particularly, in a case in which there is the initial angle difference of about 5° (for example, 4.5° to 5.5°) between the inner rotor and the outer rotor, when the inner rotor and the outer rotor rotate, misalignment occurs therebetween so that the torque ripple can be reduced by a maximum of 2%.

In addition, according to the present invention, the structure allowing the torque ripple of the dual rotor-type motor to be reduced even only through the assembly process of the shaft, the outer rotor, and the inner rotor performed by an operator is provided so that the performance of the compressor can be improved and vibration and noise can be reduced.

Although the present invention has been described with reference to the accompanying drawings as described above, the present invention is not limited by the embodiments and drawings illustrated in the present specification, and it is clear that the present invention is variously modified by those skilled in the art within a range of the technical spirit of the present invention. In addition, while the embodiments of the present invention have been described, although the operational effects according to the structure of the present invention have not been clearly described, predictable effects according to the corresponding structure should also be recognized.

The invention claimed is:

1. A dual rotor-type motor comprising:
a stator around which a coil is wound;
an outer rotor that faces an outer wheel of the stator, the outer rotor comprising a plurality of outer permanent magnets that are disposed on an inner circumferential surface of the outer rotor and arranged along a circumferential direction; and
an inner rotor that faces an inner wheel of the stator, the inner rotor comprising a plurality of inner permanent magnets that are disposed on an outer circumferential surface of the inner rotor and arranged along the circumferential direction,
wherein the inner rotor and the outer rotor are disposed at positions corresponding to initial angles of the inner rotor and the outer rotor relative to a reference direction, the initial angles being different from each other.

2. The dual rotor-type motor of claim 1, wherein a difference between the initial angles of the inner rotor and the outer rotor is from 4.5° to 5.5°.

3. The dual rotor-type motor of claim 1, wherein the initial angle of the outer rotor is defined by, an axis positioned at 40° relative to the reference direction, and
wherein the inner rotor is rotated from the axis by an angle within a range of 4.5° to 5.5° to thereby define the initial angle of the inner rotor ranging from 44.5° to 45.5° relative to the reference direction.

4. The dual rotor-type motor of claim 1, wherein:
a number of the plurality of outer permanent magnets is equal to a number of the plurality of inner permanent magnets; and
each of the plurality of outer permanent magnets is disposed at a position opposite to one of the plurality of inner permanent magnets.

5. The dual rotor-type motor of claim 4, wherein each of the plurality of outer permanent magnets and each of the plurality of inner permanent magnets are arranged about a rotation center and misaligned from each other based on the outer rotor and the inner rotor being disposed at the positions corresponding to the initial angles.

6. A dual rotor-type motor comprising:
a stator around which a coil is wound;
an outer rotor that faces an outer wheel of the stator, the outer rotor comprising a plurality of outer permanent magnets that are disposed on an inner circumferential surface of the outer rotor and arranged along a circumferential direction; and
an inner rotor that faces an inner wheel of the stator, the inner rotor comprising a plurality of inner permanent magnets that are disposed on an outer circumferential surface of the inner rotor and arranged along the circumferential direction,
wherein the inner rotor and the outer rotor are disposed at different positions from each other relative to a reference direction.

7. The dual rotor-type motor of claim 6, wherein the different positions of the inner rotor and the outer rotor correspond to initial angles of the inner rotor and the outer rotor relative to the reference direction, the initial angles being different from each other.

8. The dual rotor-type motor of claim 7, wherein a difference between the initial angles of the inner rotor and the outer rotor is from 4.5° to 5.5°.

9. The dual rotor-type motor of claim 7, wherein the initial angle of the outer rotor is defined by an axis positioned at 40° relative to the reference direction, and
wherein the inner rotor is rotated from the axis by an angle within a range of 4.5° to 5.5° to thereby define the initial angle of the inner rotor ranging from 44.5° to 45.5° relative to the reference direction.

10. The dual rotor-type motor of claim 6, wherein:
a number of the plurality of outer permanent magnets is equal to a number of the plurality of inner permanent magnets;
each of the plurality of outer permanent magnets is disposed at a position opposite to one of the plurality of inner permanent magnets; and
each of the plurality of outer permanent magnets and each of the plurality of inner permanent magnets are arranged about a rotation center and misaligned from each other based on the outer rotor and the inner rotor being disposed at the different positions.

11. A compressor comprising:
a dual rotor-type motor comprising:
a stator around which a coil is wound,
an outer rotor that faces an outer wheel of the stator, the outer rotor comprising a plurality of outer permanent magnets that are disposed on an inner circumferential surface of the outer rotor and arranged along a circumferential direction, and an inner rotor that faces an inner wheel of the stator, the inner rotor comprising a plurality of inner permanent magnets that are disposed on an outer circumferential surface of the inner rotor and arranged along the circumferential direction, wherein the inner rotor and the outer rotor are disposed at positions corresponding to initial angles of the outer rotor and the inner rotor relative to a reference direction, the initial angles being different from each other;

a shaft that passes through rotation centers of the outer rotor and the inner rotor and is coupled to the outer rotor and the inner rotor, the shaft being configured to rotate with the outer rotor and the inner rotor;

a piston configured to move linearly;

a connecting rod that is connected to the shaft through a coupling pin and configured to move the piston based on rotation of the shaft;

a cylinder configured to store a refrigerant and to compress the refrigerant based on linear movement of the piston; and a cylinder block that supports the shaft, the cylinder extending through the cylinder block.

12. The compressor of claim 11, wherein a difference between the initial angles of the outer rotor and the inner rotor is 4.5° to 5.5°.

13. The compressor of claim 11, wherein the initial angle of the outer rotor is defined by an axis positioned at 40° relative to the reference direction, and wherein the inner rotor is rotated from the axis by an angle within a range of 4.5° to 5.5° to thereby define the initial angle of the inner rotor ranging from 44.5° to 45.5°.

14. The compressor of claim 11, wherein:

the shaft comprises a coupling protrusion that extends along a longitudinal direction of the shaft and protrudes from an outer circumferential surface of the shaft;

the outer rotor defines a first insertion groove that has a size and a shape corresponding to the coupling protrusion and that receives the coupling protrusion; and the inner rotor defines a second insertion groove that has the size and the shape of the first insertion groove and that receives the coupling protrusion inserted through the first insertion groove.

15. The compressor of claim 14, wherein:

the first and second insertion grooves are defined at positions at which the outer rotor and the inner rotor are misaligned from each other corresponding to a difference between the initial angles of the outer rotor and the inner rotor relative to the reference direction; and the coupling protrusion sequentially passes through the first and second insertion grooves and is coupled to the first and second insertion grooves to place the outer rotor and the inner rotor at the positions corresponding the difference between the initial angles of the inner rotor and the outer rotor.

16. A compressor comprising:

a motor comprising:

a stator around which a coil is wound, an outer rotor that faces an outer wheel of the stator, the outer rotor comprising a plurality of outer permanent magnets that are disposed on an inner circumferential surface of the outer rotor and arranged along a circumferential direction, and an inner rotor that faces an inner wheel of the stator, the inner rotor comprising a plurality of permanent magnets that are disposed on an outer circumferential surface of the inner rotor and arranged along the circumferential direction, wherein the inner rotor and the outer rotor are disposed at different positions from each other relative to a reference direction;

a shaft that passes through rotation centers of the outer rotor and the inner rotor and is coupled to the outer rotor and the inner rotor, the shaft being configured to rotate with the outer rotor and the inner rotor;

a piston configured to move linearly;

a connecting rod that is connected to the shaft through a coupling pin and configured to linearly move the piston based on rotation of the shaft;

a cylinder configured to store refrigerant and to compress the refrigerant based on linear movement of the piston; and a cylinder block that supports the shaft, the cylinder extending through the cylinder block.

17. The compressor of claim 16, wherein the different positions of the inner rotor and the outer rotor correspond to initial angles of the inner rotor and the outer rotor relative to the reference direction, the initial angles being different from each other.

18. The compressor of claim 17, wherein a difference between the initial angles of the outer rotor and the inner rotor is 4.5° to 5.5°.

19. The compressor of claim 17, wherein the initial angle of the outer rotor is defined by an axis positioned at 40° relative to the reference direction, and wherein the inner rotor is rotated from the axis by an angle within a range of 4.5° to 5.5° to thereby define the initial angle of the inner rotor ranging from 44.5° to 45.5°.

20. The compressor of claim 17, wherein:

the shaft comprises a coupling protrusion that extends along a longitudinal direction of the shaft and protrudes from an outer circumferential surface of the shaft;

the outer rotor defines a first insertion groove that has a size and a shape corresponding to the coupling protrusion and that receives the coupling protrusion;

the inner rotor defines a second insertion groove that has the size and the shape of the first insertion groove and that receives the coupling protrusion inserted through the first insertion groove; and the first and second insertion grooves are defined at positions at which the outer rotor and the inner rotor are misaligned from each other based on a difference between the initial angles of the outer rotor and the inner rotor.

* * * * *